Feb. 25, 1964     N. B. KARAU     3,121,944
METHOD OF CRIMPING
Filed July 20, 1961     2 Sheets-Sheet 1

INVENTOR
N. B. Karau
by
Attorney

United States Patent Office 3,121,944
Patented Feb. 25, 1964

3,121,944
METHOD OF CRIMPING
Norbert B. Karau, Indianapolis, Ind., assignor to Western Electric Company, Incorporated, New York, N.Y., a corporation of New York
Filed July 20, 1961, Ser. No. 125,457
2 Claims. (Cl. 29—421)

This invention relates to a method of assembling two articles by crimping one about the other, and more particularly to a method of crimping an aperture-defining, interior, peripheral edge portion of a metal sheet about the edge of a disc. It is an object of the invention to provide an improved method of such character.

Articles of certain shapes create substantial problems in the crimping of one article about another such that they are mechanically interlocked. Such a problem arises where one article comprises a thin sheet of workable material, such as metal, which has an aperture within which another, disc-like article is to be secured. In order to crimp the aperture-defining, interior, peripheral edge portion of the metal sheet about the edge of the disc, it is necessary that this peripheral edge portion turn back substantially against itself to engage one surface of the disc, and then roll over the edge of the disc and along its other side. In this manner the extreme peripheral edge portion may bear against one side of the disc, and a closely adjacent annular portion thereof, which is substantially folded back against itself, bears against the other side of the disc. The complexity of the necessary folding of the sheet, and more particularly the double reversal of direction of the sheet, makes this crimping operation difficult to accomplish. Such a crimping operation is desirable, however, since crimping is basically simpler, less expensive and/or more permanent than other methods of joining articles, such as welding, soldering and the use of adhesive or fasteners.

Accordingly, it is another object of the invention to provide an improved method of crimping an aperture-defining, interior, peripheral edge portion of a metal sheet about the edge of a disc.

It is still another object of the invention to provide an improved method of forming a thin metal sheet, which forming includes the crimping of an aperture-defining, interior, peripheral edge portion of the sheet about the edge of a disc.

A further object of the invention is to provide an improved method of crimping, having various of the above-recited characteristics, while being efficient, reliable and economical.

In accordance with the present invention, the disc-like article is held substantially away from one surface of a base, the apertured metal sheet lying thereagainst with its aperture concentric with the disc. A block of resilient material presses against the disc and the sheet, and forces a portion of the sheet against the base. At the same time, the innermost edge portion of the sheet bears against one side of the disc, with the result that an intermediae portion of the sheet extends from the disc to the base, this intermediate portion forming a substantially cylindrical wall. The disc is then allowed to move a short distance toward the base such that the intermediate portion of the sheet folds under the disc and is crimped against the other surface thereof.

This invention, together with further objects and advantages thereof, will best be understood by reference to the following description taken in connection with the accompanying drawings, in which FIG. 1 is an elevational view in cross section of a press incorporating one embodiment of the present invention;

Figure 2:
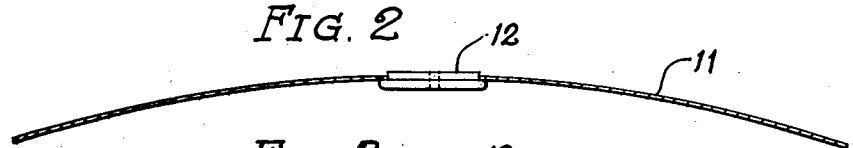
FIG. 2 is a cross-sectional view of two parts to be assembled by crimping in accordance with the present invention.
Figure 3:
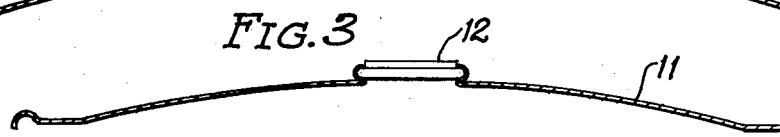
FIG. 3 is a view similar to FIG. 2 but showing the parts crimped together.
Figure 4:
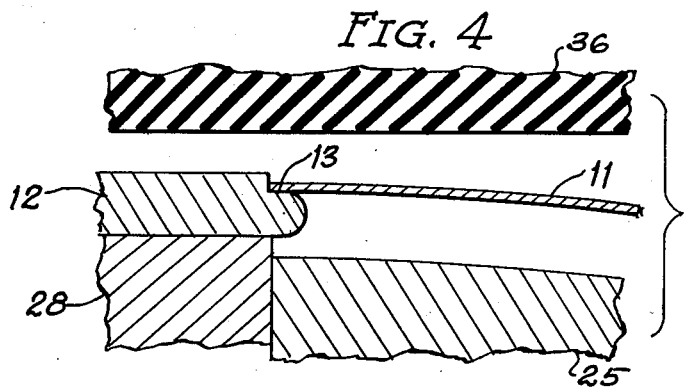
FIG. 4 is a greatly enlarged cross-sectional view of a portion of the apparatus of FIG. 1 showing the parts prior to crimping.
Figure 6:
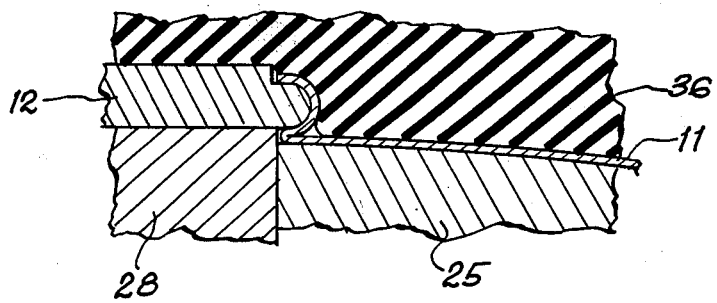
FIG. 6 is a view similar to FIGS. 4 and 5 but showing the parts fully crimped.

The present invention is well adapted to the crimping together of the two parts shown in FIGS. 2 and 4. These include a metal sheet 11 having an aperture in the center thereof, and a disc 12 which is to be secured within the aperture of the sheet 11. Preferably the lip of the disc 12 has an annular notch 13, best seen in FIG. 4, for receiving the innermost peripheral edge portion of the sheet 11 such that the aperture of the sheet may readily be held concentric with the disc. With the two parts loosely assembled as shown in FIGS. 2 and 4, it is the purpose of the present invention to crimp the sheet about the edge of the disc such that the two parts are mechanically interlocked in the manner illustrated in FIGS. 3 and 6.

In accordance with the illustrated embodiment of the invention, the sheet 11 is formed at the same time to the configuration illustrated in FIG. 3. The illustrated elements 11 and 12 comprise the diaphragm for a telephone receiver, the sheet 11 being of relatively thin sheet aluminum and the disc 12 being of steel having suitable magnetic properties.

Figure 1:
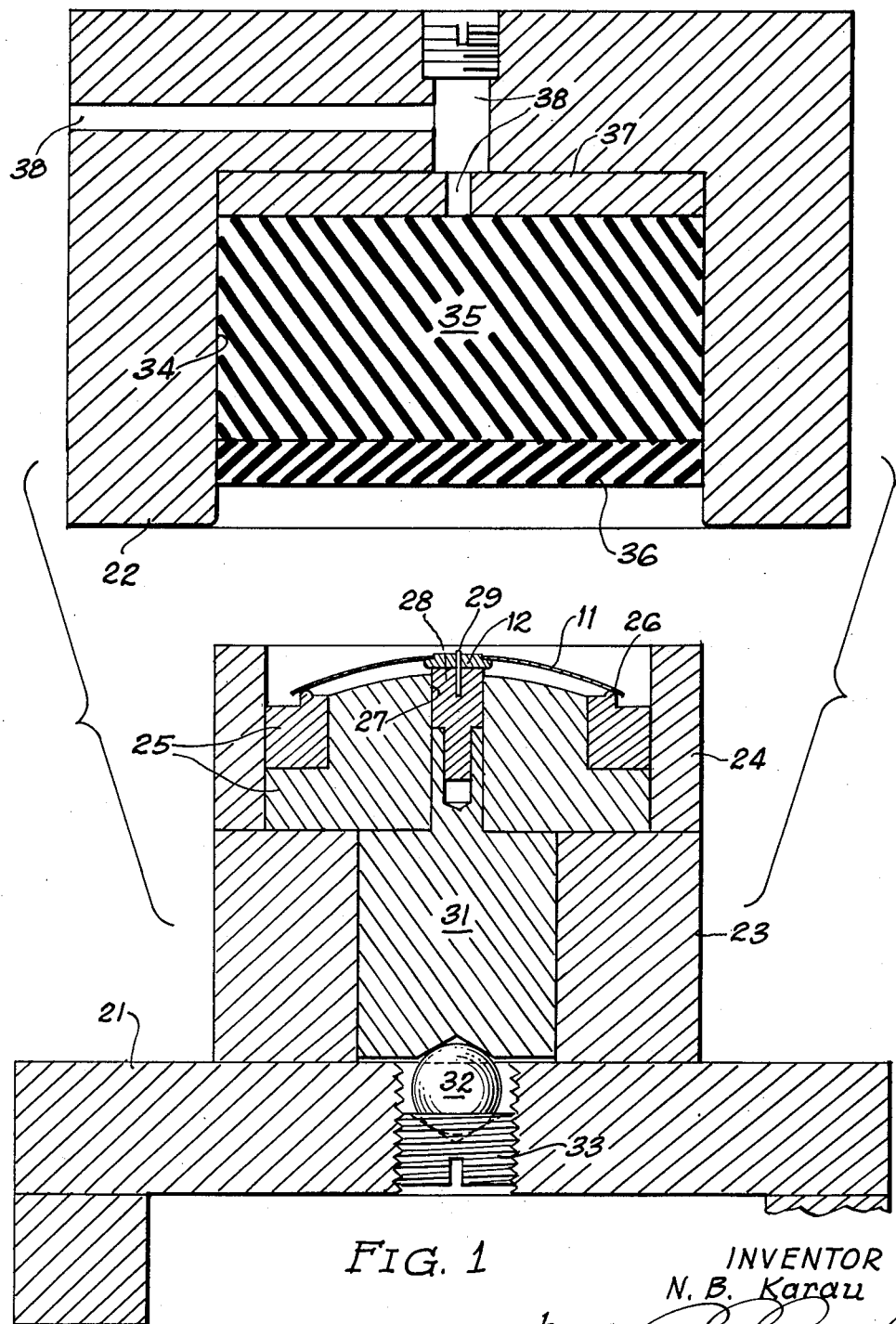

The illustrated apparatus includes a press having a fixed platen 21 and a movable platen 22. Fixedly secured to the lower platen 21 are cylinders 23 and 24 which serve to contain and support certain forming dies described below, and to guide the movable platen 22 as it approaches the fixed platen 21. A base 25, preferably formed in two parts as shown in FIG. 1, is arranged within the cylinder 24 and is seated on the cylinder 23. This base has a forming surface on its upper side, consisting primarily of a dome portion and including an annular ridge 26. It is intended that the sheet 11 be pressed against this forming surface in order that the sheet may be brought to the proper shape.

The base 25 is provided with a central aperture 27 within which is arranged an element 28 whose function is to hold the disc 12 substantially above the forming surface of the base 25. A locating pin 29 is seated in the element 28 for centering successive discs 12 thereon, each disc being provided with a cooperating central aperture.

The element 28 is supported by a block 31 which is slidable within the cylinder 23 and has a narrow portion extending into the aperture 27 in the base 25 for engaging and supporting the element 28. The block 31 is in turn supported by a ball 32 which is received within suitable seats in the block 31 and in a screw 33, the latter being threadedly received by the fixed platen 21.

The block 31 is slightly smaller in axial length than the cylinder 23 whereby limited vertical movement of the block 31 is permitted. More specifically, the screw 33 may be turned to the right to raise the block 31, the element 28 and the disc 12 to the positions illustrated in FIG. 1, and it may be turned to the left such that the block 31 seats against the fixed platen 21 and lowers the element 28 and the disc 12.

The upper platen 22 has a cylindrical recess 34 within which there is arranged a block of resilient material. In the illustrated embodiment of the invention this block consists of a thick layer 35 of rubber and a relatively thin layer 36 of neoprene, the latter serving as a wear pad. The block 35—36 of resilient material may be backed, if desired, by a steel plate 37 for convenience in handling. Preferably, air passages 38 are provided for facilitating the escape of air from the recess 34 under operating conditions.

The illustrated apparatus now having been described, it is believed that the invention may more fully be explained by description of an operating cycle of the apparatus. Let it be assumed that the screw 33 has been turned to the right such that the block 31 and the element 28 are in their raised positions. A disc 12 is arranged on the upper surface of the element 28 with the pin 29 received within the aperture in the disc.

A sheet 11 is then laid against the disc 12 with the aperture in the sheet concentric with the disc, this being facilitated by the annular notch 13 in the lip of the disc. This position of the parts is illustrated in FIGS. 1, 2 and 4.

Figure 5:
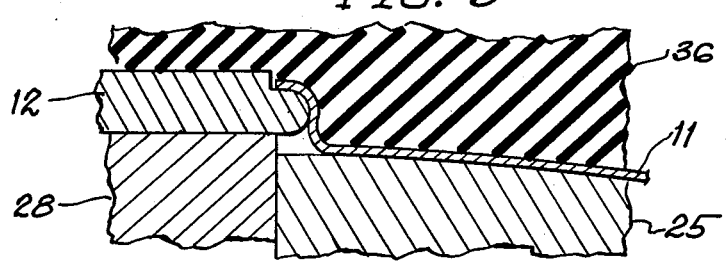
FIG. 5 is a view similar to FIG. 4 but showing the parts partially crimped.

The press is then closed, the movable platen 22 being lowered toward the fixed platen 21 such that the resilient block 35—36 is made to bear against the sheet 11 and the disc 12. Pressure of the block forces the major portion of the sheet 11 against the forming surface of the base 25, this portion of the sheet thereby being made to assume the configuration of the forming surface of the base. At the same time, the innermost edge portion of the sheet is held against the upper surface of the disc 12. Accordingly, an intermediate portion of the sheet extends from the upper surface of the disc to the forming surface of the base 25 as illustrated in FIG. 5. It is important that this intermediate portion of the sheet be brought to a nearly cylindrical configuration.

With the parts in the condition illustrated in FIG. 5, the screw 33 is turned to the left such that the block 31 and the element 28 are lowered. Since the disc 12 and the innermost edge portion of the sheet 11 which is supported by the disc move downward under influence of the continued pressure of the resilient block 35—36, the generally cylindrical, intermediate portion of the sheet 11 necessarily collapses, either radially inward or radially outward. Where this intermediate portion of the sheet has been brought to a nearly cylindrical configuration, the continued pressure of the resilient block thereagainst induces the sheet to collapse radially inward such that the downward movement of the disc crimps the sheet under it in the manner illustrated in FIG. 6.

The press may then be opened and the crimped assembly removed. Following rotation of the screw 33 to the right to return the block 31 and the element 28 to their elevated positions, the apparatus is in condition for another operating cycle.

It may now be seen that the resilient block may bring the sheet of formable material to a nearly cylindrical configuration intermediate two generally planar portions which are generally perpendicular to the intermediate cylindrical portion. It will now be appreciated also that lowering of the disc such that it is arranged at a lesser distance above the base, results in collapse of the generally cylindrical portion of the sheet, continued pressure by the block of resilient material causing the direction of collapse to be radially inward. The lowering of the disc thereby causes crimping of the sheet against the lower surface of the disc while pressure of the block of resilient material firmly maintains the innermost edge portion of the sheet against the upper surface of the disc and against the edge of the disc. Accordingly, a method has been disclosed which overcomes the problems attendant with the crimping of an aperture-defining, interior, peripheral edge portion of a sheet about the edge of a disc.

While one specific embodiment of the invention has been disclosed, many modifications will be apparent, and it is intended that the invention be interpreted as including all modifications which fall within the true spirit and scope of the invention.

What is claimed is:

1. The method of crimping an aperture-defining, interior, peripheral edge portion of a metal sheet about the edge of a disc, the disc being substantially larger in diameter than the aperture in the sheet, which method comprises supporting the disc and the sheet away from a base with the aperture of the sheet concentric with the disc, pressing a resilient block against the sheet and the disc to force a portion of the sheet against the base with the innermost edge portion of the sheet pressed against one side of the disc and with an intermediate portion of the sheet extending from the edge of the disc to the base and forming a substantially cylindrical wall, and retracting the support of the disc such that it is supported a lesser distance from the base while continuing with the exertion of pressure, whereby the intermediate portion of the sheet is buckled by a continued pressure of the resilient block against the disc and the portion of the metal sheet which faces the disc, continued pressure of the block against the intermediate portion of the metal sheet assuring that the intermediate portion of the sheet collapses in a direction radially inward about the edge of the disc.

2. The method of crimping a metal sheet about the edge of a disc, the sheet being substantially larger than the disc such that it extends away from the disc beyond the annular, crimped portion of the sheet when the disc and sheet are thus assembled, which method comprises supporting the disc and the sheet away from a base, pressing a flexible member against the sheet to force a portion of the sheet against the base with the central portion of the sheet pressed against one side of the disc and with an intermediate portion of the sheet extending from the edge of the disc to the base and forming a substantially cylindrical wall, and retracting the support of the disc such that it is supported a lesser distance from the base while continuing with the exertion of pressure, whereby the intermediate portion of the sheet is buckled by continued pressure of the flexible member against the portion of the metal sheet which faces the disc, continued pressure of the flexible member against the intermediate portion of the metal sheet assuring that the intermediate portion of the sheet collapses in a direction radially inward about the edge of the disc.

References Cited in the file of this patent

UNITED STATES PATENTS

| | | |
|---|---|---|
| 2,375,574 | Metheny et al. | May 8, 1945 |
| 2,375,599 | Walton | May 8, 1945 |
| 2,719,500 | Kraybill | Oct. 4, 1955 |
| 2,859,719 | Kraybill | Nov. 11, 1958 |